United States Patent [19]
Iwatsuki et al.

[11] Patent Number: 6,073,993
[45] Date of Patent: Jun. 13, 2000

[54] BODY STRUCTURE FOR A MOTOR VEHICLE

[75] Inventors: Syuichiro Iwatsuki; Sakae Sasaki, both of Wako, Japan

[73] Assignee: Kabushiki Kaisha Honda Gijutsu Kenkyusho, Saitama-ken, Japan

[21] Appl. No.: 08/902,792

[22] Filed: Jul. 30, 1997

[30] Foreign Application Priority Data

Aug. 5, 1996 [JP] Japan ................................ 8-223066

[51] Int. Cl.⁷ .................................................. B62D 25/08
[52] U.S. Cl. .................... 296/203.04; 296/30; 296/205; 280/788
[58] Field of Search .............................. 296/203.01, 205, 296/203.04, 29, 30, 187; 280/688, 784

[56] References Cited

U.S. PATENT DOCUMENTS 2,518,733  8/1950  Walker ..................................... 280/788
5,660,415  8/1997  Redman et al. ......................... 280/788

FOREIGN PATENT DOCUMENTS 1405211  10/1968  Germany ................................ 280/788
6-263060  9/1994  Japan ...................................... 280/788

*Primary Examiner*—D. Glenn Dayoan
*Assistant Examiner*—Jason Morrow
*Attorney, Agent, or Firm*—Skjerven, Morrill, MacPherson, Franklin & Friel LLP

[57] ABSTRACT

In a body structure for a motor vehicle of a space frame type in which a rear pillar made of an extruded aluminum alloy member and joining a roof side member and a floor side member includes an inwardly curved section to avoid an interference with a rear wheel, a damper mounting base is welded to a part of the rear pillar adjoining the part having the smallest curvature or where the stress tends to concentrate so that the mechanical strength of this part may be reinforced without requiring any special reinforcing member. Thus, both an increase in the rigidity and a reduction in the weight of a vehicle body can be achieved in an efficient manner.

5 Claims, 2 Drawing Sheets

BODY STRUCTURE FOR A MOTOR VEHICLE

TECHNICAL FIELD

The present invention relates to a vehicle body structure of a space frame type, and in particular to a vehicle body structure including a rear pillar which is curved so as to avoid an interference with a rear wheel.

BACKGROUND OF THE INVENTION

Elongated hollow members formed by extruding aluminum or other light-weight metals into a prescribed cross sectional shape have lately been drawing attention as automotive frame members because they can be freely given with a desired cross section and may be different in thickness in two different directions so that a desired mechanical strength can be achieved for each individual part of the vehicle body in a highly efficient manner.

In a so-called space frame formed by welding metallic tube or other shaped members, the rear pillar is sometimes curved in such a manner that an intermediate part of the rear pillar bulges out laterally outward to maximize the opening of the tail gate and a lower end of the rear pillar is curved inward to avoid interference with a rear wheel.

When a rear pillar given with such a shape is subjected to a bending load or a twisting load, a relatively large stress tends to develop in the parts having a relatively large curvature while no such large stress tends to develop in parts given with a smaller curvature. In particular, the mechanical stress tends to concentrate in the part of the rear pillar located in an upper part of the bulge for accommodating the rear wheel. Therefore, to optimize the overall rigidity of the frame, it was necessary to weld reinforcing members to the parts where the stress tends to concentrate or to increase the wall thickness of such parts. However, such measures inevitably led to an increase in the weight, and compromised the advantage of the space frame to allow the weight to be reduced.

BRIEF SUMMARY OF THE INVENTION

In view of such problems of the prior art, a primary object of the present invention is to provide an improved space frame type vehicle body structure which can be made highly rigid without increasing its weight.

A second object of the present invention is to provide an improved space frame type vehicle body structure including a rear pillar which may be highly curved while maintaining a sufficient rigidity without using any additional reinforcing member.

A third object of the present invention is to provide an improved space frame type vehicle body structure which can maximize the opening area in a rear part thereof without compromising the mechanical strength thereof.

These and other objects of the present invention can be accomplished by providing a vehicle body structure including a rear pillar extending between a roof member and a floor member, the rear pillar being made of an extruded member having a substantially uniform cross section, and having an inwardly curved section in a lower part thereof to avoid an interference with a rear wheel, comprising: a mounting base for a rear suspension component, the mounting base comprising a rear suspension component mounting portion for supporting the rear suspension mounting component, and a bracket portion for securing the rear suspension component mounting portion to a part of the rear pillar adjoining the inwardly curved section, the bracket portion having a certain length extending along the rear pillar and securely attached to the rear pillar.

The mechanical stress tends to concentrate in the inwardly curved portion particularly when the rear pillar is subjected to a bending load or a twisting load, but the bracket portion of the mounting base effectively reinforces the rear pillar against such stress concentration. Because the bracket portion serves the dual purpose of supporting the rear suspension component such as a spring or a damper, it is possible to effectively reinforce the rear part of the vehicle body without increasing the weight of the vehicle body.

The curvature of the inwardly curved portion tends to be significant particularly when an opening area of a rear opening of the vehicle body is desired to be maximized. The rear opening may consist of a normal rear window, a tail gate, or a hatch-back rear window.

According to a preferred embodiment of the present invention, the rear pillar consists of an extruded aluminum or aluminum alloy, and the bracket portion is welded to a part of the rear pillar having a largest curvature. An extruded member may have a desired cross section so that a desired rigidity and strength against a bending load in an arbitrary direction can be achieved by using a minimum amount of the material. Further, when an extruded member is used for forming a vehicle body, the cross section of the member may be designed such that the rigidity and strength of the member against a twisting load may be optimized. Typically, the rear pillar is made of an extruded aluminum or aluminum alloy member, but the present invention is equally applicable to frame members made of other materials such as plastics and other light weight metals or alloys having a substantially uniform cross section. Also, the basic principle of the present invention is applicable not only to the rear pillars but also to other frame members.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
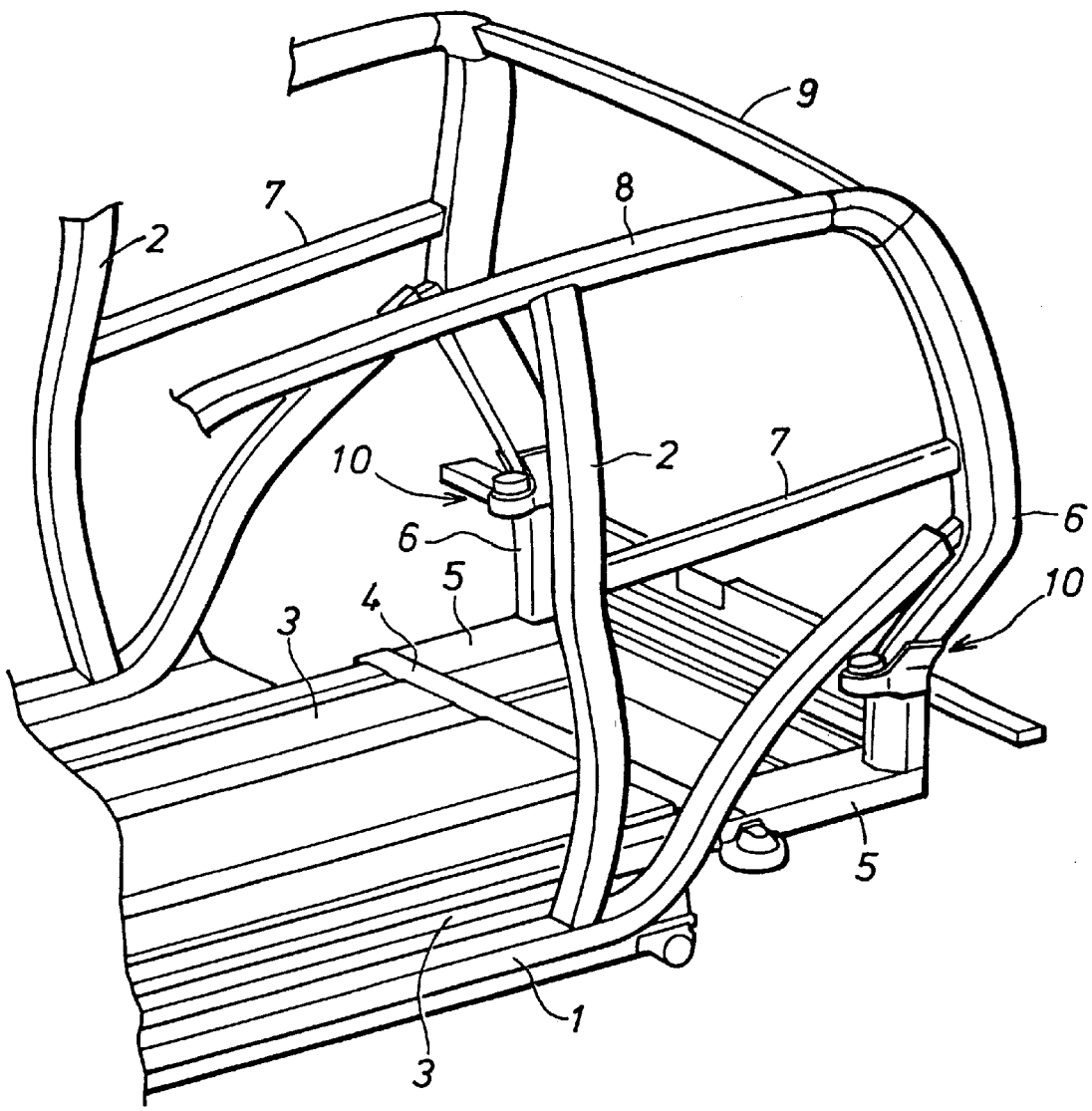
FIG. 1 is a partly broken-away perspective view showing a vehicle body frame to which the present invention is applied.
Figure 2:
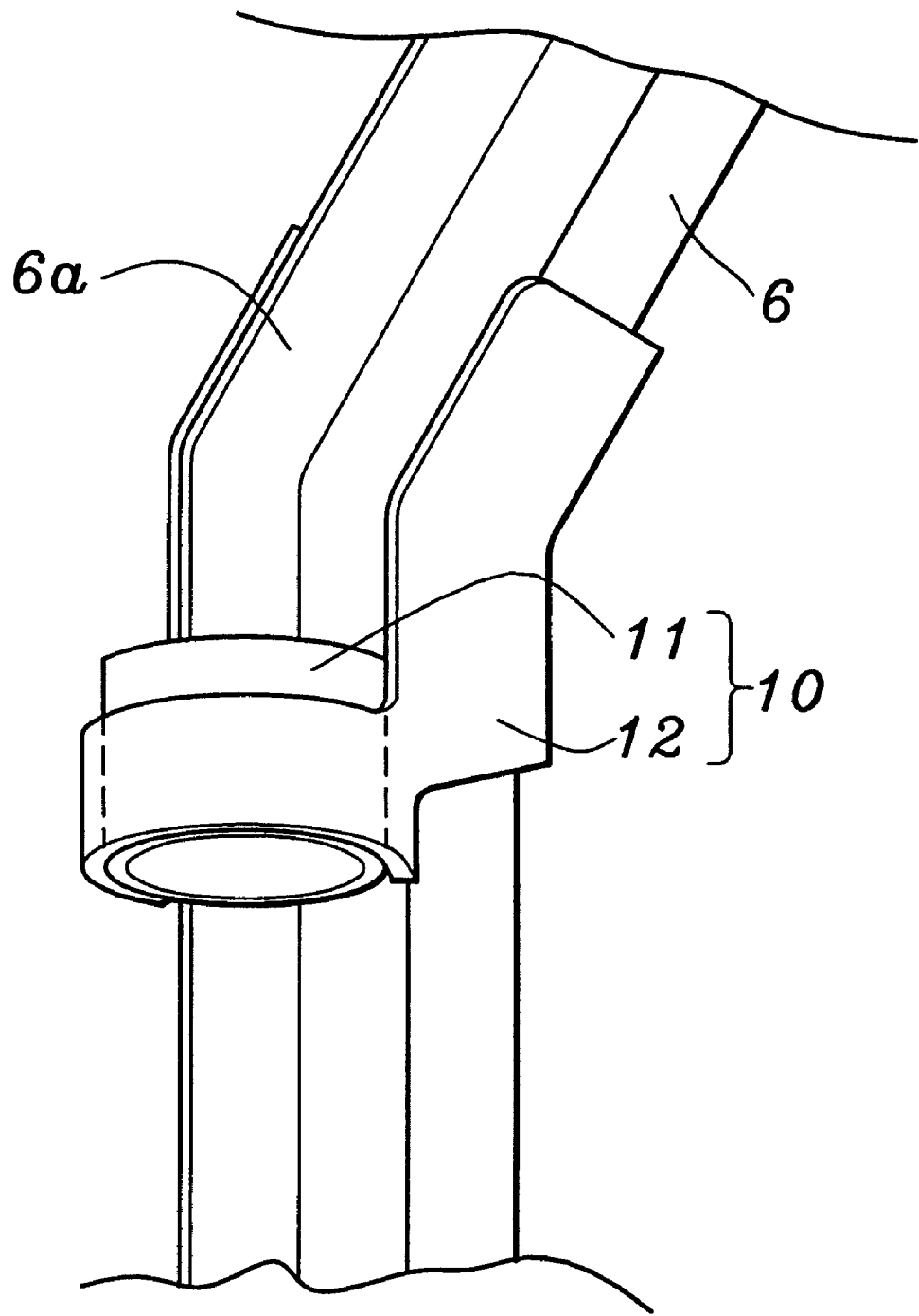
FIG. 2 is an enlarged front view of an essential part of a right rear pillar as seen from the front.

FIG. 1 shows an essential part of a vehicle body frame constructed according to the present invention. This vehicle body frame consists of a space frame structure formed by combining and welding elongated members having a uniform cross section which are made from light metallic material such as aluminum or an aluminum alloy by extrusion so as to have a cross sectional shape suitable for each particular application. The cross sectional shape may be freely selected depending on the need of each particular application, and may be hollow or given with other suitable shapes.

A lower end of each of a pair of center pillars 2 is welded to an upper surface of a side sill 1 which extends in the fore-and-aft direction. The inner side of each of the side sills 1 is welded to a front floor member 3 which is also made by combining extruded light-weight metallic material, and the rear end of the front floor member 3 is welded to a rear floor side member 5 via a cross member 4. The rear floor side member 5 and the cross member 4 are all made of similar extruded members in this embodiment. The rear end of the rear floor side member 5 is welded to the lower end of each of a pair of rear pillars 6. Vertically intermediate parts of each of the center pillars 2 and the corresponding rear pillar 6 are joined together by a side beam 7 extending in the fore-and-aft direction.

Each of the rear pillars 6 has a middle part which curves laterally outward so as to maximize the opening area of the tail gate. The upper end of each of the rear pillars 6 is welded to the rear end of a roof side member 8, and the right and left rear pillars 6 are joined together by a roof cross member 9 which extends laterally across the vehicle body. The most outwardly bulging part of each of the rear pillars 6 is welded to the rear end of the side sill 1 which is curved obliquely upward so as to avoid interference with the rear wheel. The part of each of the rear pillars 6 extending from a middle part thereof to a lower end portion thereof is curved laterally inward so as to be avoid interference with the rear wheel.

When a rear pillar given with such a shape is subjected to a bending load or a twisting load, a relatively large stress tends to develop in the parts having a relatively large curvature while no such large stress tends to develop in parts given with a small curvature. Therefore, according to the present invention, a rear damper base 10 is welded to a part adjoining a part 6a of the rear pillar 6 having the smallest curvature, which is curved laterally inward to avoid interference with the rear wheel, to thereby reinforce this part. Typically, the rear pillar 6 defines a large curvature at the upper end of the bulge for accommodating the rear wheel.

The rear damper base 10 is formed by stamp forming a metallic plate member made of a same material as the frame structure members, and comprises a cup-shaped damper mounting portion 11 and a bracket portion 12 for securing this mounting portion to the rear pillar 6. These two portions 11 and 12 are formed into a sub-assembly by being welded together in advance. By welding this rear damper base 10 to a part of the rear pillar 6 adjoining the part 6a of the largest curvature or the part of the largest curvature itself, it is possible to reinforce the part where the stress tends to concentrate without requiring any special reinforcing member.

Thus, according to the present invention, the damper base is mounted to a part of the rear pillar where the stress tends to concentrate so that the damper base effectively reinforces the rear pillar, and can increase both the bending rigidity and the twisting rigidity of the rear pillar as well as the mechanical strength of this part. In particular, because the damper base serves also as a reinforcing member, the number of parts can be reduced, and the increase in the weight and the manufacturing cost can be minimized.

Although the present invention has been described in terms of preferred embodiments thereof, it is obvious to a person skilled in the art that various alterations and modifications are possible without departing from the scope of the present invention which is set forth in the appended claims.

What we claim is:

1. A vehicle body structure including a rear pillar extending between a roof member and a floor member, said rear pillar being made of an extruded member having a substantially uniform cross section, and having an inwardly curved section in a lower part thereof to avoid an interference with a rear wheel, comprising:

a mounting base for a rear suspension component, said mounting base comprising a rear suspension component mounting portion for supporting the rear suspension mounting component, and a bracket portion for securing said rear suspension component mounting portion to a part of said rear pillar adjoining said inwardly curved section, said bracket portion having a certain length extending along said rear pillar and securely attached to said rear pillar.

2. A vehicle body structure according to claim 1, wherein said rear pillar further includes an outwardly curved section which connects to an upper end of said inwardly curved section to define a rear opening of said vehicle body.

3. A vehicle body structure according to claim 1, wherein said rear pillar consists of an extruded aluminum or aluminum alloy, and said bracket portion is welded to a part of said rear pillar having a largest curvature.

4. A vehicle body structure according to claim 1, wherein said rear suspension component consists of a damper.

5. A vehicle body structure according to claim 1, wherein said rear pillar extends between a roof side member and a floor side member.

* * * * *